United States Patent

Mingotti

[11] Patent Number: 5,727,413
[45] Date of Patent: Mar. 17, 1998

[54] PROCESS FOR HOT FORMING HOLLOW SPHERICAL BODIES

[75] Inventor: Giacomo Gioachino Mingotti, Sarezzo, Italy

[73] Assignee: Metalprint S.r.l., Ponte S. Marco-Calcinato, Italy

[21] Appl. No.: 786,799

[22] Filed: Jan. 21, 1997

[30] Foreign Application Priority Data

Jan. 22, 1996 [IT] Italy ................... BS96A0007

[51] Int. Cl.[6] ........................... B21D 53/10
[52] U.S. Cl. .............. 72/334; 72/356; 29/890.132; 29/899.1; 251/315.16
[58] Field of Search ............ 72/334, 356; 29/899.1, 29/899, 898.052, 898.053, 898.069, 890.126, 890.13, 890.14, 890.132; 251/315.16, 315.01

[56] References Cited

U.S. PATENT DOCUMENTS

| 1,591,372 | 7/1926 | Gafvert | 29/899.1 |
| 3,339,259 | 9/1967 | Johnson | 251/315.16 |
| 3,505,718 | 4/1970 | Carlstrom | 29/890.132 |
| 3,689,027 | 9/1972 | Grenier | 251/315.16 |

Primary Examiner—Daniel C. Crane
Attorney, Agent, or Firm—McGlew and Tuttle

[57] ABSTRACT

A process for forming a hollow spherical body and the spherical structure so formed. The forming includes a first phase in which a blank is provided with a half having a spherical outer surface, a remaining part having two concentric, outer and inner walls with an axial hole that is closed by an intermediate plate. In a subsequent phase the outer wall of the remaining part of the blank is given a spherical shape in continuation of the spherical half obtained in the first phase of forming.

4 Claims, 1 Drawing Sheet

PROCESS FOR HOT FORMING HOLLOW SPHERICAL BODIES

FIELD OF THE INVENTION

The present invention pertains to the manufacture of hollow spherical bodies, especially brass balls to be used as plugs in ball valves.

More specifically, the present invention pertains to a process for hot forming hollow spherical bodies diametrically.

BACKGROUND OF THE INVENTION

Various processes for the manufacture of spherical bodies of the type and for the use mentioned above have already been proposed.

According to a first process, the spherical body can be obtained from the melting of either a subform of a filled ball with a through hole, or a subform of a hollow ball having a spherical outer wall forming an integral single unit with an inner tubular wall, which delimits the through hole. In this case, the two walls define between them a cavity for making the resulting ball lighter.

According to another process, the spherical body is obtained from forming by drawing from a piece of tube; the body is therefore completely hollow on the inside and with diametrically opposed coaxial holes. The inner spherical cavity is, however, undesirable because it causes undue drops in the load and promotes the formation of unacceptable deposits or residues in the presence of perishable liquids.

A further process for the manufacture of spherical bodies by means of forming provides for the formation of a hollow spherical body from a first tubular component, with operations for drawing the opposing parts of the starting component in one or more interesting phases, the insertion into the said hollow body, before the drawing or between one drawing phase and another, of a second tubular or axially hollow component, intended for delimiting the diametrical hole of the ball, and the final fixing of the first and the second components to one another. However, this process requires two starting components.

According to yet another process, a spherical body of the type referred to above is obtained starting from a single piece, forming this in the same manner from two opposing parts in order to obtain a blank in the form of an H having double tubular, concentric walls, which are connected to a middle plate, taking up the blank again for a further forming in order to give the outer wall the spherical shape and to fold the ends of this outer wall on the ends of the inner wall, and removing the inner cross diaphragm in order to axially open the hole defined by the inner wall. With this process, the body is finished in the same manner from both parts with considerable problems with taking up again, centering and precision.

SUMMARY AND OBJECTS OF THE INVENTION

The object of the present invention is to propose a novel, original process for forming, which, starting from a full-section billet, makes it possible to obtain a diametrically hollow spherical body in a simple, rational and economical manner, without problems with taking up again and precision and with an improved degree of finish and quality.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

According to the invention, a process is provided for hot forming a hollow spherical body, especially a brass ball to be used as a plug in ball valves, starting from a billet. The formation process includes a first phase of forming the starting billet with a blank with a half having a spherical outer surface, a remaining part having two outer and inner concentric walls with a opening between one another and with an axial hole that is closed by an intermediate plate. In a subsequent phase of forming, for giving the outer wall of the remaining part of the blank a spherical shape in continuation of the spherical half obtained in the first phase of forming, and for making the free end of the said outer wall rest closely on the free end of the said inner wall, the opening is closed and a closed cavity is defined. The intermediate plate is removed for opening the axial hole, which becomes a continuous through hole.

A step is preferably provided, intended for fitting together with the end of the said inner wall in a subsequent phase of forming. The step is made at the free end of the said outer wall.

The invention also relates to the spherical body obtained with the process mentioned above.

DESCRIPTION OF THE PREFERRED EMBODIMENT

Figure 1:
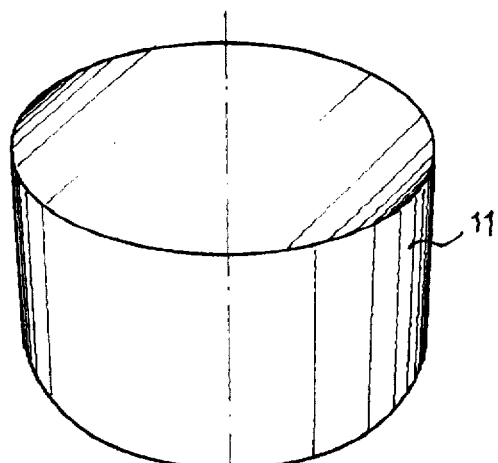
FIG. 1 is a starting billet.
Figure 2:
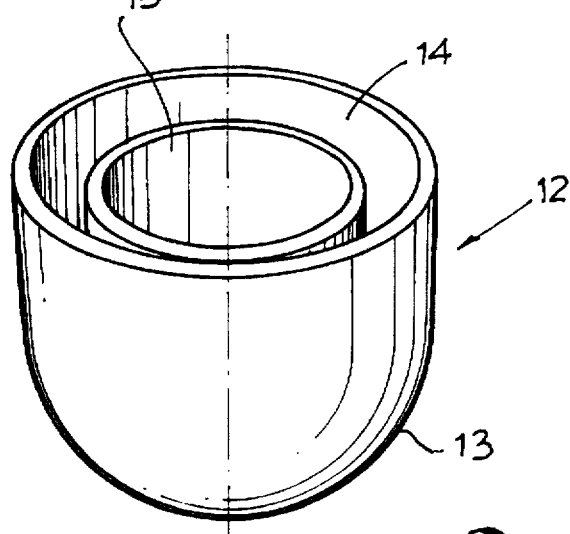
FIG. 2 is a perspective view of the blank obtained after a first phase of forming.
Figure 3:
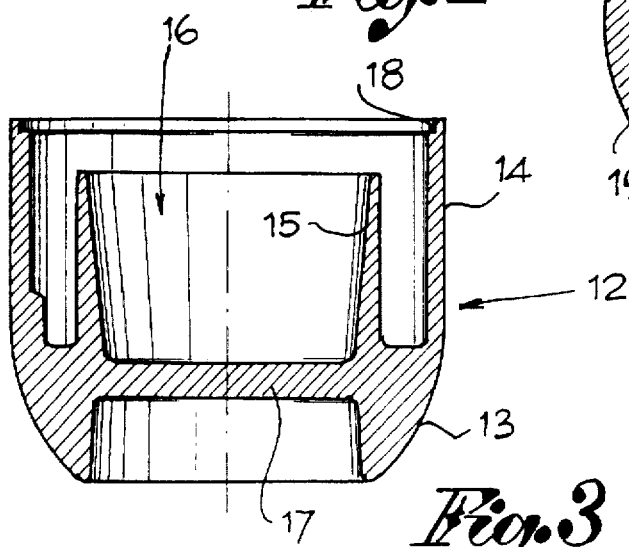
FIG. 3 is a section of the blank of FIG. 2.

Referring to the drawings in particular, the present invention provides a spherical body which is obtained starting from a brass billet 11 having suitable dimensions in diameter and length, as is shown in FIG. 1. This billet is hot formed in order to obtain a first phase of forming a blank 12, as shown in FIG. 2, with one half 13 having a spherical outer surface and with a remaining part having two outer and inner, concentric walls 14, 15, respectively, with an opening between one another. As also shown in FIG. 3, the blank 12 has, in the center, a hole 16, that is not a through hole, but is obstructed by an intermediate plate 17. The outer wall 14 is longer than the inner wall 15 and is advantageously provided, for forming or later, with a step 18 at its free end.

Figure 4:
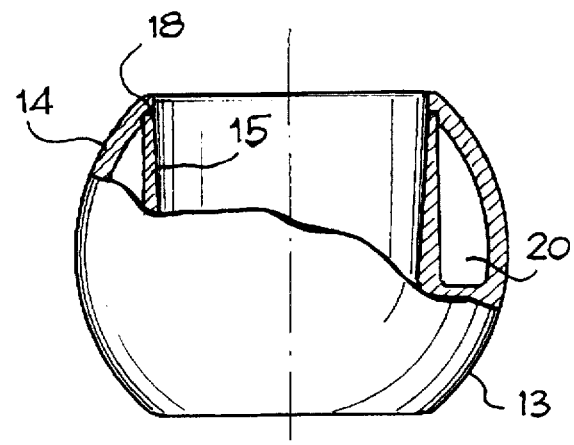
FIG. 4 is a partial section of the spherical body after its complete forming.

The blank 12 is then taken up again for a second phase of forming, with which a spherical shape is given to the outer wall 14, as is shown in FIG. 4, in continuation of the spherical half 13 preformed previously. The free end of the outer wall 14 also rests closely on the inner wall 15, making the step 18 of one wall fit together with the free end of the other.

Figure 5:
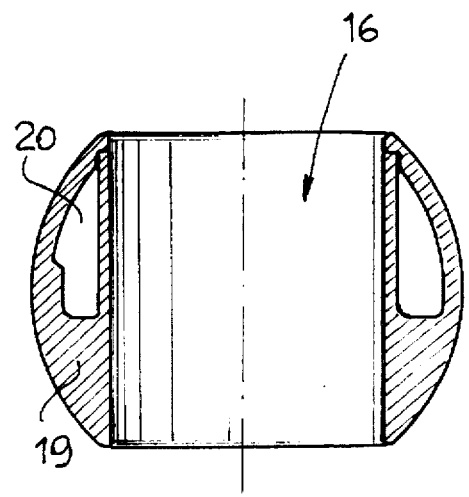
FIG. 5 is a sectional view of the finished spherical body.

Thus, a spherical body 19, which has a closed cavity 20 between the two walls 14, 15 and which, after the removal of the intermediate plate 17, has a diametrical through hole as shown in FIG. 5, is obtained.

While a specific embodiment of the invention has been shown and described in detail to illustrate the application of the principles of the invention, it will be understood that the invention may be embodied otherwise without departing from such principles.

What is claimed is:

1. A process for hot forming a hollow spherical body, especially a said brass ball to be used as a plug in ball valves, comprising:

providing a starting billet;

forming, in a first phase of forming, the starting billet into a blank with a half having a spherical outer surface, a remaining part having an outer wall and an inner wall, said outer wall and said inner wall being formed as concentric walls with an open space between said concentric walls and with an axial hole that is closed by an intermediate plate;

forming, in a subsequent phase of forming, said outer wall of said remaining part of said blank into a spherical shape in continuation of the said spherical half obtained in said first phase of forming;

closing said open space and defining a closed cavity by making a free end of said outer wall rest closely on a free end of said inner wall; and removing said intermediate plate for opening said axial hole to provide a continuous through hole.

2. A process in accordance with claim 1, further comprising:

forming a step, which is intended for fitting together with the end of the said inner wall in said subsequent phase of forming, at said free end of said outer wall.

3. A process for forming a hollow spherical body, comprising:

providing a starting billet;

forming the starting billet into a blank with a half having a spherical outer surface, a remaining part having an outer wall and an inner wall, said outer wall and said inner wall being formed as concentric walls with an open space between said concentric walls and with an axially extending central region which is closed by an intermediate portion;

forming said outer wall of said remaining part of said blank into a spherical shape in continuation of the said spherical half obtained in said first phase of forming;

closing said open space and defining a closed cavity by making a free end of said outer wall rest closely on a free end of said inner wall; and removing said intermediate portion for opening said axially extending central region to provide a continuous through hole.

4. A process in accordance with claim 3, further comprising:

forming a step, which is intended for fitting together with the end of the said inner wall in said subsequent phase of forming, at said free end of said outer wall.

* * * * *